United States Patent [19]

Shimada

[11] Patent Number: 5,068,895
[45] Date of Patent: Nov. 26, 1991

[54] ENCRYPTION AND DECRYPTION METHODS USING BIT-LENGTH PRESERVATION DECRYPTOR

[75] Inventor: Michio Shimada, Tokyo, Japan

[73] Assignee: NEC Corporation, Tokyo, Japan

[21] Appl. No.: 343,338

[22] Filed: Apr. 26, 1989

[30] Foreign Application Priority Data

Apr. 28, 1988 [JP] Japan .................................. 63-108643

[51] Int. Cl.$^5$ ................................................. H04L 9/28
[52] U.S. Cl. .......................................... 380/28; 380/9;
380/30; 380/49
[58] Field of Search ......................... 380/28, 30, 49, 50

[56] References Cited

U.S. PATENT DOCUMENTS

| 4,078,152 | 3/1978 | Tuckermann, III | 380/49 |
| 4,752,953 | 6/1988 | Paik et al. | 380/28 |
| 4,896,353 | 1/1990 | Dehgani et al. | 380/28 |

OTHER PUBLICATIONS

Rivest et al., "A Method for Obtaining Digital Signatures and Public-Key Cryptosystems", Comm. ACM, vol. 21, No. 2, pp. 120-126, 2/78.

Tanaka et al., "On Modular Exponentiation Using a Signal Processor", 1987 Nat'l. Conference of the Institute of Electronic Data Communications Engineers of Japan, Treatises, No. 15.

Tanaka et al., "Realization of RSA Cryptosystem Using Digital Signal Processor", 1988 Nat'l. Conference of the Institute of Electronic Data Communications Engineers of Japan, Treatises, No. A-298.

*Primary Examiner*—Bernarr E. Gregory
*Attorney, Agent, or Firm*—Foley & Lardner

[57] ABSTRACT

An encrypting method for producing a code which cannot be deciphered by an eavesdropper. The encrypting method does not require the bit length of input information to be increased when the information is converted into a cryptogram. The encrypting method uses a prior art encryptor and decryptor when it determines that the input information is small enough to not overrun the bit length when encrypted, and a bit-length preservation encryptor and decryptor when the input information will overrun the bit length when encrypted.

10 Claims, 8 Drawing Sheets

ENCRYPTION AND DECRYPTION METHODS USING BIT-LENGTH PRESERVATION DECRYPTOR

BACKGROUND OF THE INVENTION

The present invention relates to a method for encrypting information into a code which cannot be deciphered by an eavesdropper and a method of decrypting the code to recover the original information.

Typical of encrypting and decoding methods heretofore proposed is a RSA method which is disclosed by R. L. Rivest, A. Shamir and L. Addleman in a paper entitled "A Method for Obtaining Digital Signatures and Public-key Cryptosystems", Comm. ACM, Vol. 21, No. 2, pp. 120–126, 1978. For convenience of description, the following description will concentrate only on a case wherein information is encrypted into a cryptogram for the purpose of preventing an unauthorized person from eavesdropping on the information. The encrypting and decrypting methods will be limited to the RSA method by way of example. Let the manipulation for converting information into a cryptogram and the manipulation for decrypting a cryptogram into original information be called encrypting and decrypting respectively. The encrypting and decrypting procedures according to the RSA method use an encrypting key e and a decrypting key d each being represented by a numerical value, and a common key n shared by both encrypting and decrypting also being represented by a numerical value. These numerical values e, d, and n are predetermined integers. How to select the numerical values e, d, and n is not directly relevant to the present invention and therefore will not be described herein. The encrypting procedure particular to the RSA method begins with the step of obtaining a numerical representation P of the information. Since information is usually rendered in the form of a bit sequence of logical ZEROs and logical ONEs, it will be automatically represented by a numerical value if the bit sequence is divided into blocks each having a finite length. In the following description, therefore, information and a numerical representation of information will not be distinguished from each other so long as there is no chance of confusion. A cryptogram C is obtained by applying to the information an arithmetic operation:

$$C = P^e \bmod n$$

Specifically, the information is raised to power e and then divided by n, the residual being the cryptogram C. To recover the original information P from the cryptogram C, the following arithmetic operation is performed:

$$P = C^d \bmod n$$

This equation means that the cryptogram C is raised to power d and then divided by n, the residue being the information P.

The RSA method, as discussed in the previously mentioned paper, is designed to be elaborate not only to prevent an unauthorized person from eavesdropping on the information but also to eliminate occurrences in which a person who transmitted the information later denies the transmission because of fraud and in which an unauthorized person transmits information pretending to be an authorized person.

A problem with the prior art encrypting and decrypting methods discussed above is that the information P has to be smaller than the common key n. Otherwise the information rendered by a numerical representation P and the information rendered by a numerical representation P+n would become indistinguishable because a residual produced by the division by the common key n is computed during the course of encrypting operation. Further, to conform to the binary notation adopted for communications and computers, input information is usually divided so that the information P to be encrypted is one bit shorter than the common key n. Moreover, since information applicable to communications and computers is managed by being fractioned to a length of 2's power such as 1024 bits, even the increase in the bit length by one amounts to an increase by 1024 in total. Thus, the prior art encrypting method critically degrades the transmission of information and the efficiency of storage.

SUMMARY OF THE INVENTION

It is therefore an object of the present invention to provide an encrypting method and a decrypting method which eliminate the above-described shortcomings.

In accordance with the present invention, an encrypting method for producing a code associated with inputted information comprises the steps of (a) if a numerical representation of the inputted information is smaller than a predetermined numerical value, applying a predetermined operation to the information and producing as an interim result a residual remaining after a result of the operation is divided by the numerical value, (b) if the numerical representation of the inputted information is not smaller than the numerical value, applying a predetermined conversion to the information and producing a result of the conversion as an interim result, (c) applying a predetermined code conversion to the interim result and producing a result of the code conversion as a new interim result, (d) if the new interim result is smaller than the numerical value, applying the predetermined operation to the new interim result and producing as the code a residual remaining after a result of the predetermined operation is divided by the numerical value and (e) if the new interim result is not smaller than the predetermined numerical value, applying a predetermined conversion to the new interim result and producing a result of the conversion as the code.

Further in accordance with the present invention, a decrypting method for decrypting an inputted code to produce information associated with the code comprises the steps of (a) if a numerical representation of the code is smaller than a predetermined numerical value, applying a predetermined operation to the code, and producing as an interim result a residual remaining after a result of the operation is divided by the numerical value, (b) if the numerical representation of the code is not smaller than the predetermined numerical value, applying a predetermined inverse-conversion to the code and outputting a result of the inverse-conversion as an interim result, (c) applying a predetermined code inverse-conversion to the interim result and outputting a result of the code inverse-conversion as a new interim result, (d) if the new interim result is smaller than the numerical value, applying a predetermined operation to the interim result and outputting as the information a residual remaining after a result of the operation is divided by the numerical value and (e) if the new interim result is not smaller than the numerical value, applying a predetermined inverse-conversion to the interim result and outputting a result of the inverse-conversion as the information.

BRIEF DESCRIPTION OF THE DRAWINGS

Other features and advantages of the invention will become apparent from the following description when taken in conjunction with the accompanying drawings in which.

DESCRIPTION OF THE PREFERRED EMBODIMENTS

The principle of the present invention will be described before entering into detailed description of the preferred embodiments. In order to confine the bit length of a cryptogram within the bit length of information P, it is necessary that all the information and cryptograms shorter than a common key n with respect to bit length be associated one-to-one with each other. Otherwise, different information would be encrypted into the same cryptogram and, hence, the original information would not be correctly recovered. With the prior art RSA method, it is possible to hold information and cryptograms which are shorter than the common key n with respect to bit length in one-to-one correspondence, only if keys e, d and n are skillfully selected. This is described in detail in the previously mentioned paper. It follows that the bit length of a cryptogram C can be prevented from becoming longer than that of information P by associating those information and cryptograms whose values are greater than the common key n one-to-one by a predetermined conversion. Information P may be encrypted by the conventional method if it is smaller than the common key n, while it may be encrypted by the conversion if it is greater than the common key n. This kind of encrypting procedure will hereinafter be referred to as a bit-length preservation encrypting method for convenience. A cryptogram C produced by the bit-length preservation encrypted method may be decrypted to obtain original information P by using the prior art method if it is smaller than the common key n, while such a cryptogram C may be decrypting by applying an inverse conversion thereto if it is greater than the common key n. Such a decrypting procedure will be referred to as a bit-length preservation decrypting method merely for convenience.

A problem with the bit-length preservation encrypting method is that, although the bit length does not increase, the information will be output after a simple conversion if the numerical representation P of the information is greater than the common key n. In the light of this, for those applications which need privacy, the following procedure is adopted. Specifically, inputs and outputs are held in one-to-one correspondence, and use is made of a code conversion which is such that in response to an input numerical value greater than the common key n a numerical value which is smaller than the common key n is output. Such a code conversion is applied to a cryptogram produced by the bit-length preservation encrypting method, and then the bit-length preservation encrypting method is effected again with the code-converted cryptogram. This allows all the information to be encrypted. To recover the original information from the information which has been encrypted by the above method, the bit-length preservation decrypting method is practiced with the cryptogram. Then, an inverse conversion opposite to the above code conversion is applied to the resulting data, followed by the bit-length preservation decrypting again.

While the present invention has been discussed above in relation to the RSA method only, it will be apparent that it is similarly applicable to any other encoding and decrypting procedures of the kind performing a predetermined arithmetic operation with input data, dividing the result of arithmetic operation by a given numerical value, and outputting the residual. This is because the present invention adopts, among various properties of the RSA method, only the property that information and cryptograms which are smaller than the common key n are associated one-to-one with each other, and because this property is also true with the previously discussed general encoding and decrypting methods.

The above description has concentrated on preventing an unauthorized person from eavesdropping on information. The present invention is also successful in eliminating occurrences in which one who transmitted information later denies the transmission because of fraud and in which an unauthorized person transmits false information pretending to be an authorized person. It will be clear from the previously mentioned paper that combining the encoding and decrypting procedures particular to the present invention implements the above alternative purposes.

Figure 1:
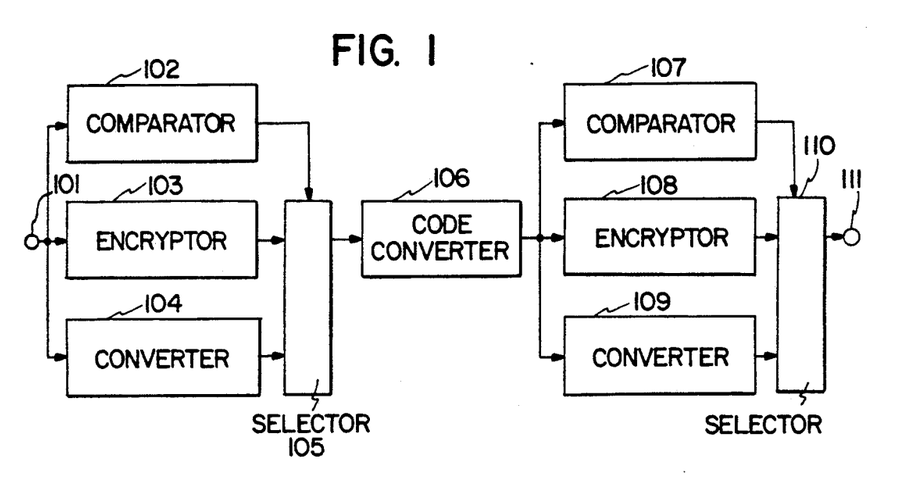
FIG. 1 is a schematic block diagram of a device for practicing an encrypting method embodying the present invention.

Referring to FIG. 1 of the drawings, a device for practicing an encrypting method embodying the present invention is shown. In the figure, the encrypting device is generally made up of an input terminal 101, comparators 102 and 107, encryptors 103 and 108, converters 104 and 109, selectors 105 and 110, a code converter 106, and an output terminal 111. Information coming in through the input terminal 101 is fed to the comparator 102, encryptor 103, and converter 104. The comparator 102 compares the input information, or numerical value, with a common key n and produces a (logical) ONE if the input value is smaller than the common key n and a (logical) ZERO if otherwise. The encryptor 103 encrypts the input by using the RSA method or similar conventional encrypting method and produces the result. The converter 104 converts the input information, i.e., the numerical value on a predetermined one-to-one basis. The selector 105 selects the output of the encryptor 103 if the output of the comparator 102 is a ONE and selects the output of the converter 104 if it is a ZERO. Receiving the output of the selector 105, the code converter 106 applies a predetermined code conversion thereto and delivers the result to the comparator 107, encryptor 108, and converter 109. While the relationship between the comparator 107, encryptor 108, converter 109 and selector 110 is the same as the relationship between the comparator 102, encryptor 103, converter 104 and selector 105, it is not necessary that the former shares the same common key, encrypting key and a conversion with the latter. The output of the selector 110 is fed out via the output terminal 111 in the form of a cryptogram.

Figure 2:
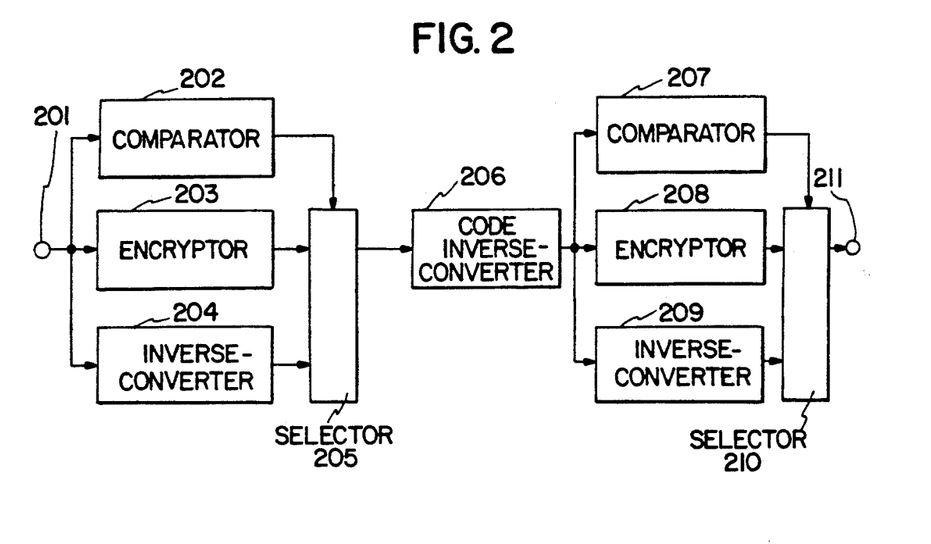
FIG. 2 is a schematic block diagram of a device for practicing a decrypting method embodying the present invention.

Referring to FIG. 2, a device for practicing a decrypting method also embodying the present invention is shown which is constructed to recover the original information from the cryptogram output by the encrypting device of FIG. 1. As shown, the decrypting device has an input terminal 201, comparators 202 and 207, decryptors 203 and 208, selectors 205 and 209, a code inverse-converter 206, and an output terminal 211. The cryptogram applied to the input terminal 201 is fed to the comparator 202, decryptors 203 and inverse-converter 204. The comparator 202 compares the cryptogram, or numerical value, with the common key n and produces a ONE if the former is smaller than the latter while producing a ZERO if otherwise. The decryptors 203 performs the conventional decrypting operation corresponding to the encryptor 108 with the input. The inverse-converter 204 applies a conversion opposite to the conversion performed by the converter 109 of FIG. 1 to the input numerical value. The selector 205 selects the output of the decryptor 203 if the output of the comparator 202 is a ONE and selects the output of the inverse-converter 204 if it is a ZERO. Receiving the output of the selector 205, the code inverse-converter 206 applies a code conversion opposite to the code conversion performed by the encryptor 106 of FIG. 1 thereto. The output of the code inverse-converter 206 is fed to the comparator 207, decryptor 208, and inverse-converter 209. The comparator 207, decryptor 208, inverse-converter 209 and selector 210 are related to each other in the same manner as the comparator 202, decryptor 203, inverse-converter 204, and selector 205. However, a prerequisite is that the common key, decrypting key and inverse conversion assigned to the selector 207, decryptor 208, and inverse-converter 209 be in a particular relationship with those of the comparator 102, encryptor 103, and, the converter 104: the same common key is shared by the selectors 102 and 207, encryptor 103, and decryptor 207, the decrypting key of the decryptor 208 corresponds to the encrypting key of the encryptor 103, and the inverse conversion performed by the inverse-converter 209 is opposite to the conversion performed by the inverse-converter 104. The output of the selector 210 is fed out via the output terminal 211 in the form of recovered information.

The comparators 102, 107, 202 and 207 and the selectors 105, 110, 205 and 210 are implemented by a connection of a plurality of standard logic integrated circuits. The encryptors 103 and 108 and the decryptors 203 and 208 may each be implemented by a commercially available signal processor such as μPD77230 developed by NEC for signal processing purposes. This signal processor is described in a paper entitled "On Modular Expotentiation Using a Signal Processor", 1987 National Conference of the Institute of Electronic Data Communications Engineers of Japan, Treatises, No. 15, and a paper entitled "Realization of RSA Cryptosystem using Digital Signal Processor", 1988 National Conference of the Institute of Electronic Data Communication Engineers of Japan, Treatises, No. A-298.

Although the converters 104 and 109 may each be constituted by a ROM (Read Only Memory), there is a chance that an eavesdropper may find the conversion procedure by reading data out of the ROM. Therefore, performing complicated conversions with the converters 104 and 109 will not be so effective. For this reason and considering the intricacy of construction of the device, it is sufficiently effective that each of the converters 104 and 109 produce its output without any conversion. In such a case, the inverse-converters 204 and 209 will also produce their outputs without applying any inverse conversion thereto.

While the code converter 106 may also be implemented by a ROM, not performing complicated processing is recommended for the same reason as discussed above in relation to the converters 104 and 109. A simple code conversion is available for converting a numerical value which is not smaller than the common key n to a number which is smaller than the common key n and setting up one-to-one correspondence between inputs and outputs, as follows.

Figure 3:
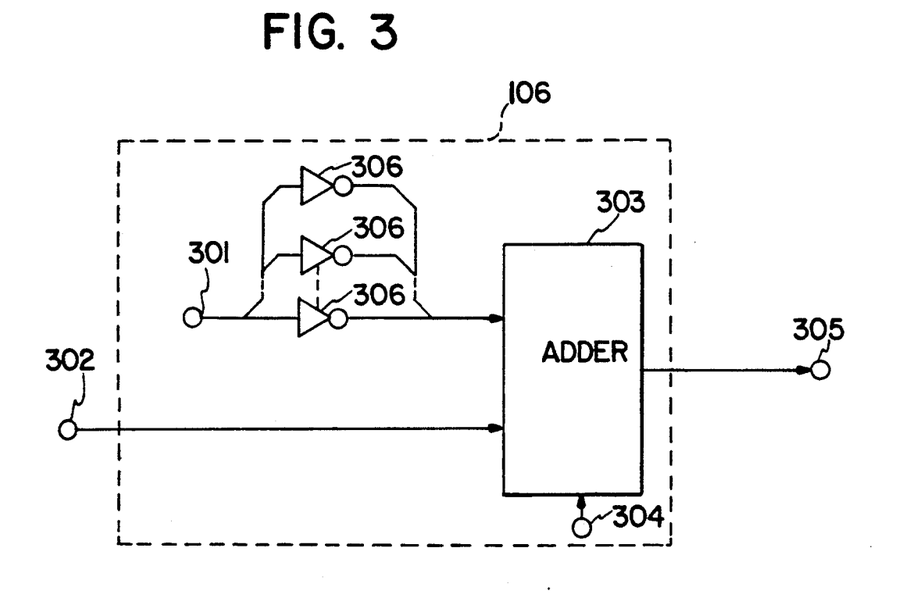
FIG. 3 is a schematic block diagram showing a specific construction of a code converter included in the encrypting device of FIG. 1.

FIG. 3 shows a specific construction of the code converter 106 included in the encrypting device of FIG. 1. In the figure, a plurality of NOT circuits 306 are provided for inverting all the bits of the common key n which is applied to a terminal 301. An adder 303 adds the outputs of the NOT circuits 306 to a code which is fed thereto via an input terminal 302, the sum being fed out via an output terminal 305. The adder 303 has a carry input 304 to which a ONE is fed via a terminal 304. In this construction, the common key n is subtracted from the input code and the result is outputted.

Figure 4:
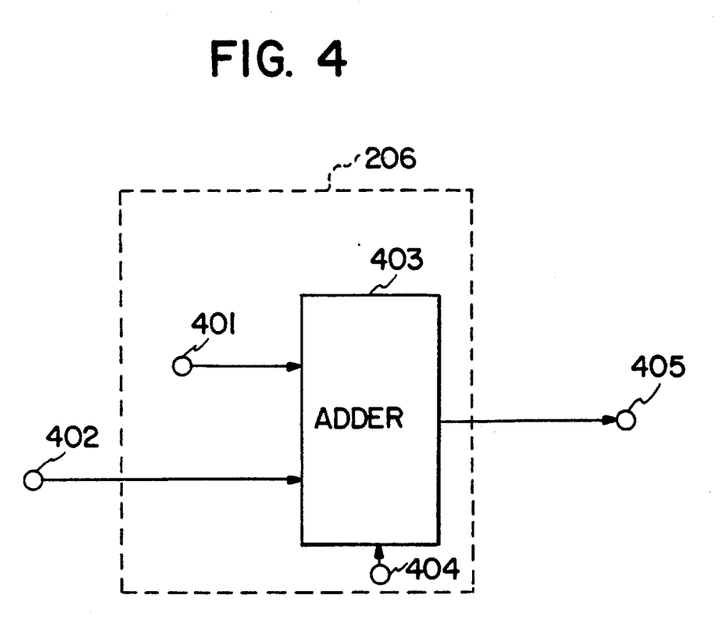
FIG. 4 is a schematic block diagram showing a specific construction of a code inverse-converter included in the decrypting device of FIG. 2.

FIG. 4 shows a specific construction of the code converter 206 included in the code inverse-converter 206. An adder 403 adds the common key n applied to a terminal 401 and a code applied to an input terminal 402, the sum being fed out via an output terminal 405. The adder 403 has a carry input to which a ZERO is applied via a terminal 404.

Figure 5:
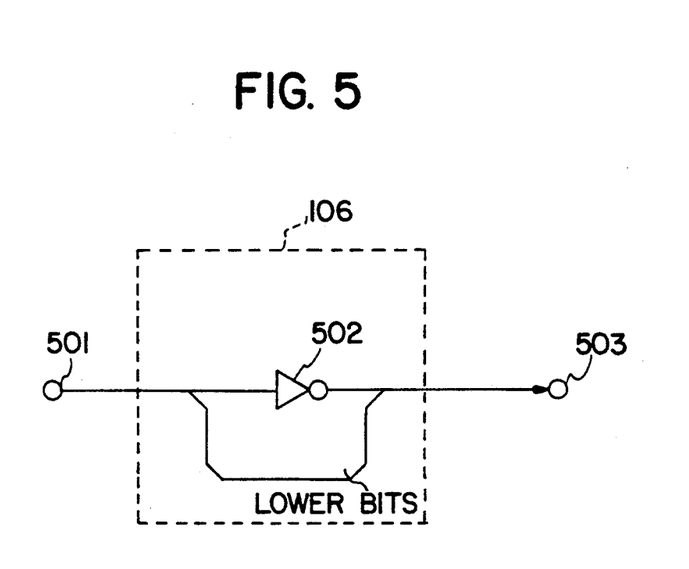
FIG. 5 is a schematic block diagram showing another specific construction of the code converter included in the encrypting device of FIG. 1.

FIG. 5 shows another specific construction of the code converter 106. In the figure, a NOT circuit 502 inverts the most significant bit of a code which is fed thereto via an input terminal 501 and delivers the result via an output terminal 503. Lower bits of the input code are directly fed out via the output terminal 503. When use is made of such a code converter, a code inverse-converter associated with the code converter will have the same construction as the latter.

Figure 6:
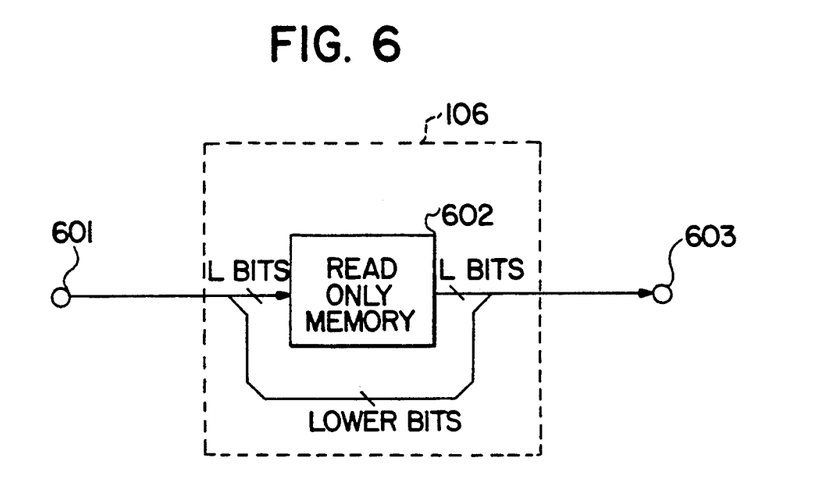
FIG. 6 is a schematic block diagram showing still another specific construction of the code converter of FIG. 1.

FIG. 6 shows still another specific construction of the code converter 106 which is implemented by a ROM 602. The ROM 602 has L address bits and stores L bits of predetermined data in each of its addresses. Upper L bits of a code coming in through an input terminal 601 are fed to the ROM 602 in the form of an address signal, so that data associated with those bits are read out of the ROM 602 and fed out via an output terminal 603. Lower bits of the input code are directly outputted via the output terminal 603. A code inverse-converter associated with a code converter having the above construction will have the same construction as the latter, but a ROM of the code inverse-converter should be loaded with data in such a manner as to effect code conversion inverse from the ROM 602.

Figure 7:
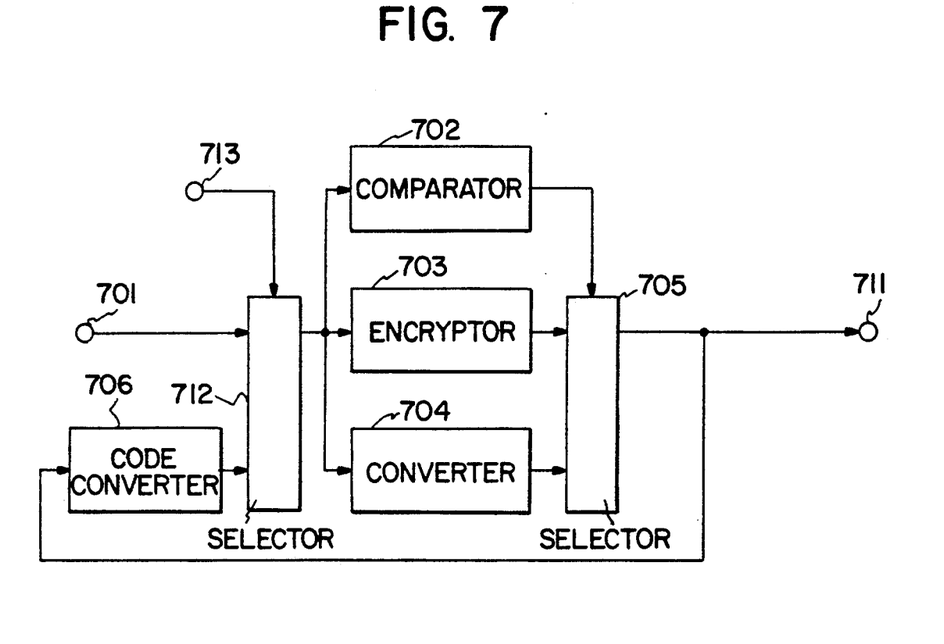
FIG. 7 is a schematic block diagram representative of an alternative embodiment of the encrypting method in accordance with the present invention.

Referring to FIG. 7, an alternative embodiment of the encrypting method in accordance with the present invention is shown. As shown, the encrypting device is composed of input terminals 701 and 713, a comparator 702, an encryptor 703, a converter 704, selectors 705 and 712, a code converter 706, and an output terminal 711. Information applied to the input terminal 701 is fed to the selector 712. The selector 712 first selects the information and delivers it to the comparator 702, encryptor 703, and converter 704. Comparing the input numerical value with the common key n, the comparator 702 produces a ONE if the former is smaller than the latter and a ZERO if otherwise. The encryptor 703 performs the conventional encrypting operation with the input and produces the result. The converter 704 applies a predetermined one-to-one conversion to the input numerical value. The selector 705 selects the output of the encryptor 703 if the output of the comparator 702 is a ONE and selects the output of the converter 704 if it is a ZERO. The code converter 706 effects a predetermined code conversion with the output of the converter 705, delivering an output thereof to the selector 712. Then, the selector 712 selects the output of the code converter 706, so that the above-described manipulations applied to the information are executed with the output of the code converter 706. Finally, the output of the selector 705 is fed out via the output terminal 711 in the form of a cryptogram. The selector 712 is switched over by a control signal which is applied to an input terminal 713. With the encrypting device of FIG. 7, it is possible to repeat the above operation applied to information more than two times by repeating the feedback of the output of the selector 705 to the code converter 706. For each of such repetitive operations, use may be made of a different common key and a different encrypting key.

Figure 8:
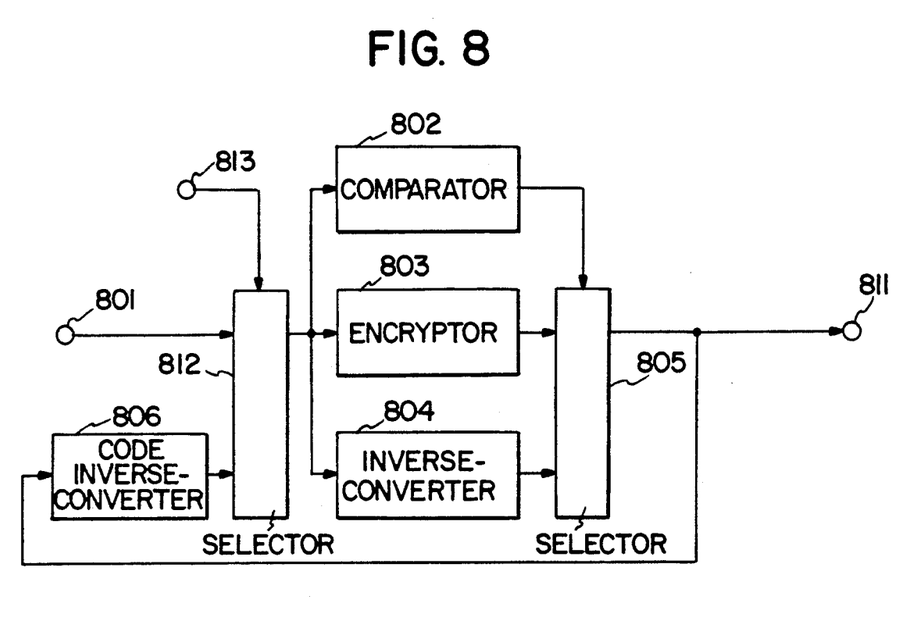
FIG. 8 is a schematic block diagram showing an alternative embodiment of the decrypting method in accordance with the present invention.

Referring to FIG. 8, an alternative embodiment of the decrypting method in accordance with the present invention is shown. As shown, the decrypting device is made up of input terminals 801 and 813, a comparator 802, a decryptor 803, an inverse-converter 804, selectors 805 and 812, a code inverse-converter 806, and an output terminal 811. A cryptogram applied to the input terminal 801 is fed to the selector 812. The selector 812 first selects the cryptogram and delivers it to the comparator 802, decryptor 803, and inverse-converter 804. Comparing the input numerical value with the common key n, the comparator 802 produces a ONE if the former is smaller than the latter and a ZERO if otherwise. The decryptor 803 decrypts the input by using conventional principles. The inverse-converter 804 applies a predetermined one-to-one conversion to the input numerical value. The selector 805 selects the output of the decryptor 803 if the output of the comparator 802 is a ONE and selects the output of the inverse-converter 804 if it is a ZERO. Receiving the output of the selector 805, the code inverse-converter 806 performs a predetermined code inverse conversion with the input and feeds its output to the selector 812. At this time, the selector 812 selects the output of the code inverse-converter 806, so that the above operation applied to the cryptogram is executed with the output of the code inverse-converter 806. The output of the selector 805 is fed out in the form of recovered information. The selector 812 is switched over by a control signal which is applied to an input terminal 813. With the construction of FIG. 8, it is possible to repeat the above operation more than two times by repeating the feedback of the output of the selector 805 to the code inverse-converter 806. The number of times of repetition should be the same as that of the encrypting device of FIG. 7. In the device shown in FIG. 8, a different common key and a different decrypting key may be assigned to each of the repetitive operations. It is to be noted, however, that when the coding device of FIG. 7 uses common keys n(1), n(2), . . . , n(M) and encrypting keys e(1), e(2), . . . e(M) in this order and decrypting keys d(1), d(2), . . . , d(M) are associated respectively with the encrypting keys e(1), e(2), . . . e(M), the decrypting device should use the common keys n(M), . . . , n(2), n(1) and the decrypting keys d(M), d(2), . . . d(1) in this order.

While the present invention has been described in conjunction with the preferred embodiments thereof, it will now readily be possible for those skilled in the art to put the present invention into practice in various other manners.

What is claimed is:

1. An encrypting method for producing a code associated with input information, comprising the steps of:
   (a) if a numerical representation of said input information is smaller than a predetermined numerical value, applying a first predetermined operation to said input information to produce a first result of said predetermined operation and after said first result of said first predetermined operation is divided by said predetermined numerical value, producing a first residual as an interim result;
   (b) if said numerical representation of said input information is not smaller than said predetermined numerical value, applying a first predetermined conversion to said input information and producing a result of said first predetermined conversion as said interim result;
   (c) applying a predetermined code conversion to said interim result and producing a result of said predetermined code conversion as a new interim result;
   (d) if said new interim result is smaller than said predetermined numerical value, applying a second predetermined operation to said new interim result to produce a second result of said second predetermined operation and, after said second result of said second predetermined operation is divided by said numerical value, producing a second residual as said code; and
   (e) if said new interim result is not smaller than said predetermined numerical value, applying a second predetermined conversion to said new interim result and producing a result of said second predetermined conversion as said code.

2. An encrypting method as claimed in claim 1, wherein said first predetermined conversion comprises a conversion for directly outputting said input information.

3. An encrypting method as claimed in claim 1, wherein said predetermined code conversion comprises a code conversion for performing one of adding and subtracting said interim result and said numerical value.

4. An encrypting method as claimed in claim 1, wherein said predetermined code conversion comprises a conversion for inverting a most significant bit of said interim result.

5. An encrypting method as claimed in claim 1, wherein steps (c) to (e) are repeated a plurality of times by using said code produced by one of step (d) and step (e) as a further interim result, and said further interim result produced by said one of step (d) and step (e) which is executed last is outputted as an ultimate code.

6. A decrypting method for decrypting an input code to produce information associated with said code, comprising the steps of:
   (a) if a numerical representation of said code is smaller than a predetermined numerical value, applying a first predetermined operation to said code to produce a first result of said first predetermined operation and after said first result of said predetermined operation is divided by said predetermined numerical value, producing a first residual as an interim result;
   (b) if said numerical representation of said code is not smaller than said predetermined numerical value, applying a first predetermined inverse-conversion to said code and outputting a result of said first predetermined inverse-conversion as said interim result;
   (c) applying a predetermined code inverse-conversion to said interim result and outputting a result of said predetermined code inverse-conversion as a new interim result;
   (d) if said interim result is smaller than said predetermined numerical value, applying a second predetermined operation to said interim result to produce a second result of said second predetermined operation and after said second result of said second predetermined operation is divided by said numerical value, outputting a second residual as said information; and
   (e) if said new interim result is not smaller than said predetermined numerical value, applying a second predetermined inverse-conversion to said interim result and outputting a result of said second predetermined inverse-conversion as said information.

7. A decryping method as claimed in claim 6, wherein said first predetermined inverse-conversion comprises a conversion for directly outputting said code.

8. A decrypting method as claimed in claim 6, wherein said predetermined code inverse-conversion comprises a conversion for performing one of adding and subtracting said interim result and said numerical value.

9. A decrypting method as claimed in claim 6, wherein said predetermined code inverse-conversion comprises a conversion for inverting a most significant bit of said interim result.

10. A decrypting method as claimed in claim 6, wherein steps (c) to (e) are repeated a plurality of times by using said code produced by one of step (d) and step (e) as a further interim result, and said further interim result produced by said one of step (d) and step (e) is outputted as ultimate information.

* * * * *